US 7,250,900 B2
(12) United States Patent
Ohnishi (10) Patent No.: US 7,250,900 B2
(45) Date of Patent: Jul. 31, 2007

(54) SYSTEM AND METHOD FOR SIDELOBE REDUCTION USING DETECT-AND-SUBTRACT TECHNIQUES (75) Inventor: Katsumi Ohnishi, Centreville, VA (US)

(73) Assignee: Information Systems Laboratories, Inc., San Diego, CA (US)

( * ) Notice: Subject to any disclaimer, the term of this patent is extended or adjusted under 35 U.S.C. 154(b) by 155 days.

(21) Appl. No.: 11/207,430

(22) Filed: Aug. 19, 2005

(65) Prior Publication Data
US 2007/0040729 A1 Feb. 22, 2007

(51) Int. Cl.
G01S 13/52 (2006.01)
(52) U.S. Cl. .................. 342/93; 342/159; 342/195; 342/196; 342/131; 342/132; 342/134; 342/135; 342/162
(58) Field of Classification Search .................. 342/93, 342/109, 131–135, 159, 162, 195, 196
See application file for complete search history.

(56) References Cited

U.S. PATENT DOCUMENTS

| 3,362,024 | A | | 1/1968 | Badewitz | |
| 3,649,125 | A | | 3/1972 | Lehmann | |
| 4,608,566 | A | | 8/1986 | Ennis et al. | |
| 5,334,981 | A | | 8/1994 | Smith et al. | |
| 5,534,876 | A | | 7/1996 | Erickson et al. | |
| 5,583,517 | A | | 12/1996 | Yokev et al. | |
| 5,760,732 | A | * | 6/1998 | Marmarelis et al. | ........ 342/145 |
| 5,969,662 | A | * | 10/1999 | Hellsten | .................... 342/25 A |
| 6,078,289 | A | | 6/2000 | Manoogian et al. | |
| 6,313,783 | B1 | | 11/2001 | Kuntman et al. | |
| 6,677,890 | B2 | | 1/2004 | Halsey et al. | |
| 6,724,340 | B1 | | 4/2004 | Carlos et al. | |
| 2006/0227038 | A1 | * | 10/2006 | Ohnishi | ........................ 342/93 |
| 2007/0040729 | A1 | * | 2/2007 | Ohnishi | ........................ 342/93 |

OTHER PUBLICATIONS

"Evaluation of a pulse coding technique for speckle reduction and structure characterization", Rao, N.A.H.K.; Abury, M. Ultrasonics Symposium, 1993. Proceedings., IEEE Oct. 31, 1993-Nov. 3, 1993 pp. 1175-1180 vol. 2.*

* cited by examiner

Primary Examiner—John B. Sotomayor
(74) Attorney, Agent, or Firm—Nydegger & Associates (57) ABSTRACT A radar system and method for detecting targets using pulse-compressed signals is disclosed. In one application, the systems and methods can be used to detect one or more relatively small targets whose pulse-compressed signals are masked by the time-sidelobes of a larger target's return signal. The method includes an iterative, detect-and-subtract signal algorithm that processes the post-compressed signal to detect multiple targets. Specifically the processing algorithm operates on the post-compressed signal to identify a point spread function (PSF) that corresponds to the relatively large target. Once identified, the PSF corresponding to the largest target in the post-compressed signal is subtracted from the post-compressed signal to generate a residual signal. This residual signal, in turn, includes the PSFs for the other targets. This process of identifying and subtracting the PSF of the largest target in the residual signal is then repeated until all targets are detected.

20 Claims, 3 Drawing Sheets

SYSTEM AND METHOD FOR SIDELOBE REDUCTION USING DETECT-AND-SUBTRACT TECHNIQUES

The U.S. Government has a paid-up license in this invention and the right in limited circumstances to require the patent owner to license others on reasonable terms as provided for by the terms of Contract No. F30602-03-C-0240 awarded by the Missile Defense Agency, Rome AFRL/SNR.

FIELD OF THE INVENTION

The present invention pertains generally to radar systems and methods for detecting a plurality of closely spaced targets. More particularly, the present invention pertains to systems and methods that use pulse-compressed radar signals for target detection. The present invention is particularly, but not exclusively, useful for detecting a relatively small target that is located in close proximity to a relatively large target.

BACKGROUND OF THE INVENTION

Pulse radar systems are capable of detecting remote targets and measuring the position (e.g. range), the radar cross section (i.e. size) and the velocity of the detected targets. When pulsed signals are used, the time period corresponding to the round trip travel of the pulse can be used to calculate target range. When pulses having relatively long pulse durations are employed, it is often difficult to detect and accurately calculate the range of two or more closely spaced targets. Specifically, with long pulses, the scattered returns from closely spaced targets overlap, preventing the return signals from being properly distinguished.

Short pulses, on the other hand, can be used to resolve closely spaced targets. However, with the use of short pulses, pulse energy becomes a consideration. Indeed, all other things being equal, a short pulse has less energy than a long pulse. When pulses having insufficient energy are used, the return signals produced have a correspondingly low energy, and cannot be detected. Since radar systems are limited in terms of peak power, it is difficult to produce a short pulse having sufficient energy to detect relatively small targets.

Pulse compression is a technique that can be used to reduce the duration of a pulse while maintaining a relatively large pulse energy. Typically, modern pulse compression techniques introduce a wideband, coded modulation into the pulse. Examples of this wideband modulation include linear frequency modulation and pseudo-random phase modulation.

When a coded pulse encounters a target, a scattered signal containing the code (or a variation thereof) is created. This scattered signal is then received and processed to "find" the code within the scattered return signal data. For this purpose, the correlation property of the code can be used. More specifically, a correlation function defined by $$r(k) = \sum_{l=1}^{N} c(k-l)c(l)$$

can be used to find a so-called "zero offset" between the code and the correlation function. The location of this "zero offset" results in a peak when pulse power (usually measured in db) is plotted against range. This peak is indicative of the target range. Unfortunately, during this process, so-called "time-sidelobes" are created and show up, together with a peak, in the pulse-compressed signal. Oftentimes, the time-sidelobes of a relatively large target's return signal mask the peak of a relatively small target's signal return. In the absence of a suitable technique to overcome this problem, small targets that are in close proximity of a large target may be undetectable.

In light of the above, it is an object of the present invention to provide radar systems and methods suitable for the purposes of detecting a plurality of closely spaced targets of differing radar cross section. It is another object of the present invention to provide radar systems and methods for detecting a relatively small target having a return signal that is masked by the time-sidelobe of a relatively large target's return signal. Yet another object of the present invention is to provide radar systems and methods for detecting targets which are easy to use, relatively simple to implement, and comparatively cost effective.

SUMMARY OF THE INVENTION

The present invention is directed to radar systems and methods for detecting targets using pulse-compressed signals. In one application, the systems and methods can be used to detect one or more relatively small targets whose radar return signals are masked by the radar return signal created by a relatively large target. More specifically, the present invention can be used to detect a target whose return signal is masked by the time-sidelobes of another target's return signal.

For the present invention, the system includes a radar transmitter for generating and transmitting one or more coded pulse signal(s). Each pulse signal is typically modulated with a pre-selected waveform. For example, the signal can be modulated with a pseudo-random coded waveform, or alternatively, a linear frequency modulated (e.g. chirped) waveform can be used. For the system, the transmitter is oriented to direct at least one pulse toward a targeted area. At the targeted area, the transmitted signal is scattered by each target located in the target area. This scattered signal is then received by a receiver and pulse-compressed. The pulse-compressed signal is then processed to detect the targets.

In greater detail, for the present invention, an iterative, detect-and-subtract signal algorithm is used to process the pulse-compressed signal and detect the targets. Recall, that the present invention is applicable to operational environments where the pulse-compressed signal of a relatively small target may be masked by the time-sidelobes of another, typically larger, target's return signal. With this in mind, the processing algorithm operates on the pulse-compressed signal to identify a point spread function (PSF) corresponding to a relatively large (i.e. masking) target. For these methods, the PSF can be characterized as having a central peak and accompanying time-sidelobes.

In one implementation of the invention, the peak of the PSF of the largest target is identified using a constant false alarm rate (CFAR) technique. Once identified, the PSF (including the peak and the time sidelobes) which corresponds to the largest target is then subtracted from the pulse-compressed signal to generate a first residual signal. This first residual signal, in turn, includes the PSFs for the other targets in the targeted area.

After the PSF for the largest target has been detected and subtracted from the pulse-compressed signal, the next step in the present method is to use the first residual signal to identify other targets. For this purpose, the processing algorithm outlined above is repeated. Specifically, the PSF of the largest target in the first residual signal is identified, for example, using the constant false alarm rate (CFAR) technique. Once identified, the PSF corresponding to the largest target in the first residual signal is then subtracted from the residual signal. This process is repeated until all targets having signal returns with energies above a pre-selected threshold are detected.

Many currently operational radar systems use Doppler filtering to process return signals and determine a detected target's velocity. As described above, the present invention can be used to process pulse-compressed return signals irregardless of whether they have been manipulated by Doppler filtering. When used with Doppler filtered return signals, the present invention uses PSFs corresponding to targets in two-dimensional (range×Doppler) space (i.e. signal power is a function of both range and frequency).

In a first implementation, Doppler filtering can be performed on a single pulse. An example of this type of Doppler filtering is used on the AEGIS SPY-1 radar. For this type of Doppler filtering, the pulse-compressed signal can be characterized as having a frequency, $f_c$, a pseudo-random coded waveform, $c(r)$ and a chip interval, $T_c$. When a pulse is scattered by a target having a radial speed, v, the pseudo-code of the pulse-compressed signal will be modulated by scattering targets as $$c_R(rT_c) = c(rT_c)\exp(i2\pi\theta_d rT_c),$$

where $$f_d = -\frac{2v}{c}f_c,$$

and r denotes the range bin index. For this case, the PSF corresponding to the scattering target $p_f$ can be computed as a convolution of $c_R(r)$ with $c(r)$, namely, $$p_f(r) = c_R(r) \otimes c(r).$$

For another type of Doppler filtering (so-called conventional Doppler filtering), a pulse-compressed signal includes a plurality of pulses in a coherent pulse interval. For this type of Doppler filtering, a two-dimensional PSF can be generated by: 1) weighting the return signal corresponding to a point source, and 2) applying a fast Fourier transform to the weighted return signal. Using the PSF generated in this manner, a detect-and-subtract process as described above can be employed to detect each target.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
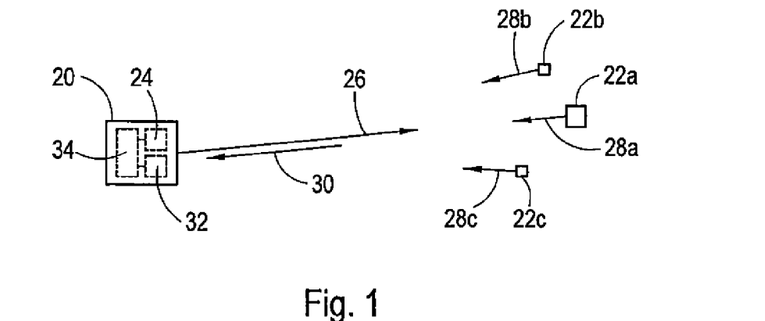
FIG. 1 is a schematic of a radar system for detecting a plurality of targets.

Referring to FIG. 1, a radar system 20 is shown for detecting a plurality of targets, such as exemplary targets 22a-c shown. Although three targets 22a-c are shown in FIG. 1, it is to be appreciated that more than three and as few as one target 22 can be detected with the system 20. As further shown in FIG. 1, the radar system 20 can include a radar transmitter 24 configured to generate and transmit a pulse signal 26. The transmitted signal 26 typically consists of a pulse train having one or more pulses. For the system 20, the transmitted signal 26 can be modulated with a pre-selected waveform. Suitable waveforms can include, but are not necessarily limited to: 1) a pseudo-random coded waveform, and 2) a linear frequency modulated (e.g. chirped) waveform.

Continuing with FIG. 1, it can be seen that the transmitted signal 26 is scattered by each target 22a-c generating a respective target scatter signal 28a-c. These scatter signals 28a-c combine to create a return signal 30. For the system 20, the return signal 30 is then received by a receiver 32 for subsequent processing (e.g. by processor 34). Although the system 20 is shown having a receiver 32 that is collocated with the transmitter 24, it is to be appreciated that this arrangement is merely exemplary. As an alternate to this collocated arrangement, the skilled artisan will quickly gather that an operational system 20 can be prepared wherein portions of the receiver 32 and transmitter 24 are common (i.e. a transceiver) or that the system 20 can be configured as a bistatic radar (i.e. having a receiver 32 that is distanced from the transmitter 24).

Figure 2A:
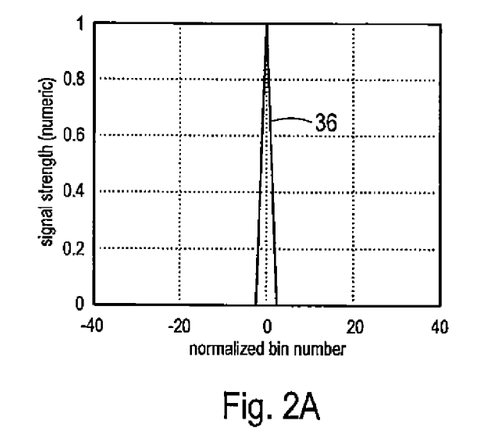
FIG. 2A illustrates a delta function representing a point source of unit strength placed at the $0^{th}$ range bin.
Figure 2B:
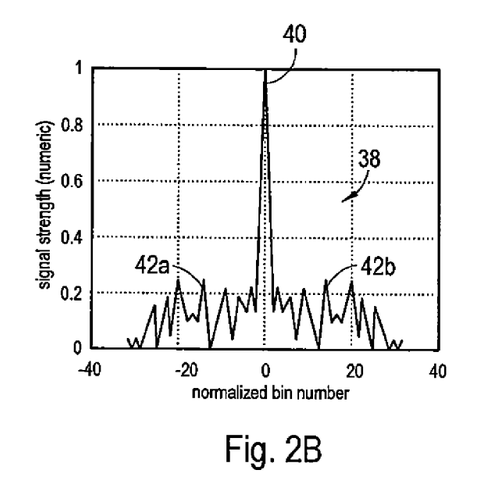
FIG. 2B illustrates a compressed pulse shape generated from the delta function shown in FIG. 2A using a bi-phase code consisting of 32 chips.

For the system 20, each target 22a-c is considered to consist of point sources/scatterers. FIG. 2A shows a delta function 36 representing a point source of unit strength placed at the $0^{th}$ range bin. A corresponding compressed pulse shape generated using a bi-phase code consisting of 32 chips is shown in FIG. 2B. As seen there, the operation of pulse compression spreads out a point source represented by the delta function 36 (FIG. 2A) to a PSF 38 that can be characterized as having a single peak 40 at the target location and accompanying time-sidelobes 42a,b.

For the system 20, it can be assumed that targets 22a-c consist of a collection of point scatterers. As a consequence, the pulse-compressed signal 43 (see FIG. 3A) can be considered to represent a summation of shifted and scaled PSFs, with one PSF for each target 22a-c. Functionally, for the system 20, the pulse compression operation is performed to recover the corresponding delta function for each target 22a-c from the summation of scaled and shifted PSFs in the pulse-compressed signal 43.

Figure 3A:
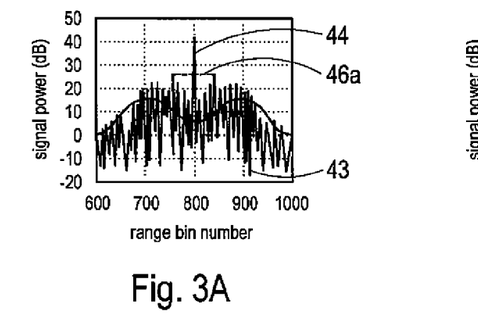
FIG. 3A illustrates a return signal for a group of targets wherein the largest target has a PSF peak of approximately 42 db.
Figure 3B:
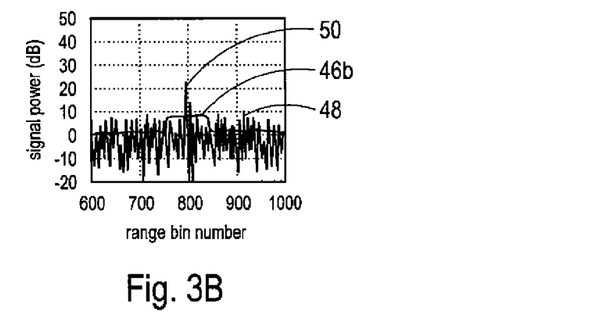
FIG. 3B illustrates a residual signal for the group of targets generated by subtracting the PSF of the largest target from the return signal shown in FIG. 3A.

FIGS. 3A-3D illustrate, step by step, a detect-and-subtract processing routine to detect the three targets 22a-c (shown in FIG. 1). Beginning with FIG. 3A, the signal power is plotted against range bin number for the pulse-compressed signal 43. For the illustration shown in FIGS. 3A-3D, targets are detected using a constant false alarm rate (CFAR) technique. Specifically, for this example, a peak is identified as a target if the peak exceeds twelve decibels above the CFAR average. Thus, peak 44 is identified as the largest target (i.e. target 22a) because peak 44 is more than twelve decibels above the CFAR average 46a for the pulse-compressed signal 43. FIG. 3A also illustrates that although the largest target (i.e. target 22a) can be detected from the pulse-compressed signal 43, peaks corresponding to the other targets (i.e. targets 22b and 22c) are masked by the PSF of the largest target.

Once the largest target has been identified, the PSF corresponding to the largest target in the pulse-compressed signal 43 is then subtracted from the pulse-compressed signal 43. This PSF includes the peak 44 and accompanying time-sidelobes (see also FIG. 2B). For this example, the detect-and-subtract step described immediately above generates the residual signal 48 shown in FIG. 3B. This residual signal 48, which is a compressed signal, includes the PSF for the other targets (i.e. targets 22b and 22c). With the residual signal 48 generated, a CFAR average 46b for the residual signal 48 is calculated. Again, for this example, a peak is identified as a target if the peak exceeds twelve decibels above the CFAR average. Thus, peak 50 is identified as the largest target (i.e. target 22b) in the residual signal 48 because peak 50 is more than twelve decibels above the CFAR average 46b for the residual signal 48.

Next, the PSF corresponding to the largest target (i.e. target 22b) in the residual signal 48 is then subtracted from the residual signal 48. For this example, this second detect-and-subtract iteration results in the residual signal 52 shown in FIG. 3C. From FIG. 3C, it can be seen that after subtracting the PSFs corresponding to the two largest targets (i.e. targets 22a and 22b), a peak 54 corresponding to the smallest target (i.e. target 22c) is revealed.

Figure 3C:
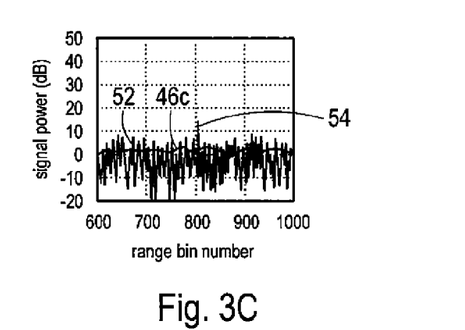
FIG. 3C illustrates the residual signal after another detect-and-subtract iteration wherein the PSF of the largest target in the residual signal shown in FIG. 3B has been subtracted.
Figure 3D:
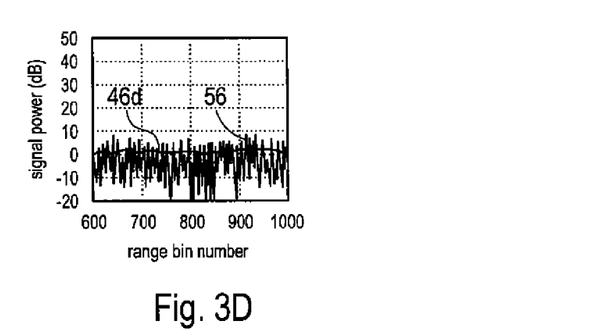
FIG. 3D illustrates the residual signal after a detect-and-subtract iteration has been performed on the residual signal shown in FIG. 3C, and shows that after this final detect-and-subtract iteration, there are no other target return signals that exceed the base noise level.

FIGS. 3C and 3D illustrate another iteration of the detect-and-subtract process. Specifically, for the residual signal 52 generated as described above, a CFAR average 46c is calculated. Again, for this example, a peak is identified as a target if the peak exceeds twelve decibels above the CFAR average. Thus, peak 54 is identified as a target (i.e. target 22c) in the residual signal 52 because peak 54 is more than twelve decibels above the CFAR average 46c for the residual signal 52. FIG. 3D shows the residual signal 56 that results after subtraction of the target 22c PSF from the residual signal 52 shown in FIG. 3C. For this new residual signal 56, a new CFAR average 46d is calculated. From FIG. 3D, it can be seen that no other peaks are present in the residual signal 56 that exceed the CFAR average 46d by more that twelve decibels. Thus, there are no other targets to detect.

The system 20 can also be configured to incorporate the effects of Doppler frequency shifts that are caused by the movement of the targets 22a-c. For this configuration of the system 20, moving targets are characterized not only by amplitude and phase but also by Doppler frequency. In general, to accommodate these characteristics (i.e. amplitude, phase and Doppler frequency) the above-described detect-and-subtract methods can be used by generating PSFs in two-dimensional range×Doppler space.

Mathematically, the Doppler shift can be computed as:

$$f_d = -\frac{2v}{c} f_c$$

where v is the target radial speed and $f_c$ is the radar frequency. In addition, the pseudo-code received by a radar is modulated by the target as:

$$c_R(rT_c) = c(rT_c) \exp(i2\pi f_d r T_c)$$

where $T_c$ is the chip interval and r denotes the range bin index. For simplicity of notation, $T_c$ can be dropped as long as it does not cause confusion. The corresponding PSF can then be computed as a convolution of $c_R(r)$ with $c(r)$:

$$p_f(r) = c_R(r) \otimes c(r)$$

where the suffix f of the PSF indicates the dependence on Doppler frequency.

Below, two implementations of the system 20 are described, each of which account for Doppler effects. In these two implementations, PSFs corresponding to targets are generated in two-dimensional range×Doppler space. It is to be appreciated and understood that these two implementations are merely exemplary, and those skilled in the pertinent art can routinely extend the teachings provided herein to other Doppler filtering schemes using PSFs that are generated in two-dimensional range×Doppler space.

In one implementation, the system 20 can be configured for processing a return signal that has been Doppler filtered using a common Doppler signal processing technique that is currently employed in AEGIS SPY-1 radars. These AEGIS SPY-1 radars typically use a pseudo-random coded waveform, and accordingly, a pseudo-random coded waveform is considered here. It is to be appreciated that the algorithm described herein can also be extended to LFM radar waveforms without difficulty. One advantage of the AEGIS crude Doppler filtering is that it requires only one pulse.

In order to make the derivation applicable to general pulse compression techniques, a complex notation is used to represent a code: $\exp(j\phi(r))$, where $\phi(r)$ denotes the phase at the $r^{th}$ chip. For a bi-phase coding system, $\phi(r)$ may be set to either 0 or $\pi$.

For a target with Doppler frequency shift $f_D$, the returned pulse may be represented as $$s(r) = \exp(j2\pi f_D r) \exp(j\phi(r)) \quad (1)$$

where a signal of unit power is assumed for simplicity. In equation (1), the effects of the carrier frequency can be ignored assuming an appropriate downconversion followed by filtering. Also, the sampling interval has been suppressed in equation (1). In equation (1), the term, $\exp(j2\pi f_D r)$, represents the effect of target Doppler in a pulse. The AEGIS Doppler filtering technique is a crude technique which capitalizes on this Doppler shift term. If the signal is pulse-compressed using the code $\exp(j2\pi f_D r)\exp(j\phi(r))$, no performance degradation results. Since the target Doppler frequency $f_D$ is unknown, a finite number of candidate (fixed) Doppler frequencies are assumed and are used for pulse compression. Specifically, L candidate frequencies can be assumed, for which a pulse can be compressed using L "modified" pseudo-codes:

$$\exp(j2\pi \hat{f}_l r)\exp(j\phi(r)), l=1,2,\ldots,L. \quad (2)$$

These "modified" codes generate a crude Doppler filter bank.

Figure 4:
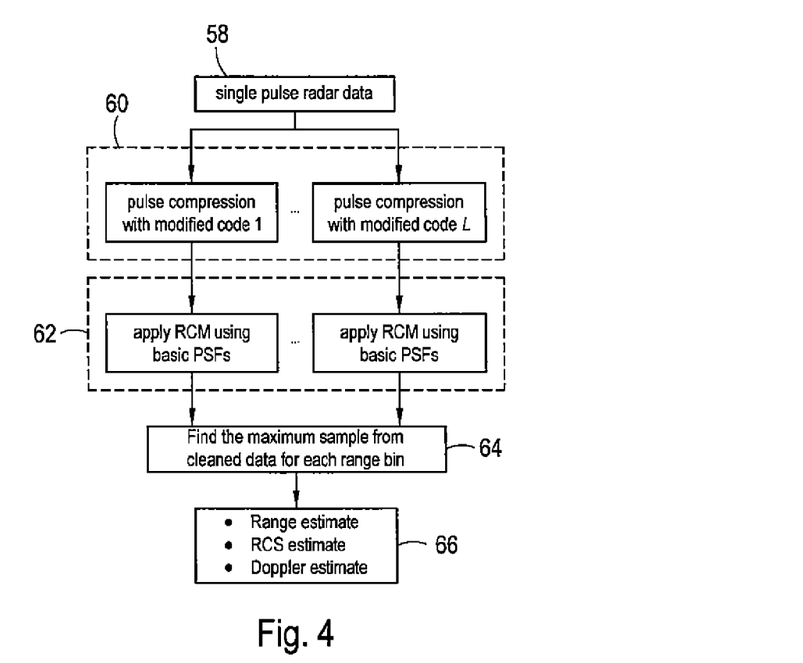
FIG. 4 shows a flowchart architecture for employing the detect-and-subtract technique with the AEGIS crude Doppler filtering.

FIG. 4 shows a flowchart architecture for employing the detect-and-subtract technique with the AEGIS crude Doppler filtering. Specifically, as shown, single pulse radar data (box 58) is used to generate $L \times N_R$ two-dimensional data (box 60), where $N_R$ denotes the number of range bins. Specifically, in box 60, a single pulse of radar is compressed using the modified code generated according to equation (2), above. Next, basic PSFs (i.e. PSFs generated under the assumption of zero Doppler frequency) are generated and cleaned (box 62) using the detect-and-subtract method. The cleaned data is then used to find the maximum sample from each range bin (box 64). For each detection range bin, the filter with the largest output power is identified and the corresponding frequency is chosen to be the estimate of the target Doppler (box 66).

In another implementation, the system 20 can be configured for processing a return signal that has been Doppler filtered using what is commonly called conventional Doppler filtering. This conventional Doppler filtering technique typically requires multiple pulses in a coherent pulse interval (CPI), unlike the above-described AEGIS crude filtering which requires only one pulse. To describe the implementation of the system 20 for use with conventional Doppler filtering, the post-compressed radar signal of the $n^{th}$ pulse at the $r^{th}$ range bin, y(r, n), is weighted and a fast Fourier transform (FFT) is applied:

$$\hat{y}(r,m) = \sum_{n=0}^{M-1} w(n)y(r,n)\exp\left(-j\frac{2\pi}{M}nm\right), \quad (3)$$

where $\{w(n)\}$ denote weights that are used to reduce high sidelobes associated with a FFT and M is the number of pulses.

Following equation (1), above, the target return for the $n^{th}$ pulse at the $r^{th}$ range bin can be represented as:

$$p_{f_D}(r,n)=\exp(j2\pi n T_p f_D)\exp(j2\pi f_D r)\exp(j\phi(r)) \quad (4)$$

A pulse is compressed in the Doppler filtering technique using the code sequence, $\exp(j\phi(r))$. Thus, a PSF can be computed as:

$$p_{f_D}(r,n)=\exp(j2\pi n T_p f_D)\exp(j2\pi f_D r)\exp(j\phi(r)) \otimes \exp(j\phi(r)). \quad (5)$$

The target frequency $f_D$ can be restricted to those of integer multiples of $1/(MT_p)$ as usually assumed in Doppler filtering, i.e., $f_D = m_D/(MT_p)$ for some integer $m_D$, $m_D=0, 1, 2, \ldots, M-1$. Under this assumption, the number of PSFs to be used can be reduced to M. Substituting $f_D=m_D/(MT_p)$ into (5), leads to:

$$p_{m_D}(r,n) = \exp\left(j\frac{2\pi}{M}nm_D\right)\left[\left(\exp\left(j\frac{2\pi}{MT_p}m_D r\right)\exp(j\phi(r))\right) \otimes \exp(j\phi(r))\right] \quad (6)$$

where the subscript $m_D$ is used to indicate the dependence of the PSF on target Doppler frequency. The PSF of equation (6) is herein named "time-PSF" to avoid confusion.

A two-dimensional PSF can be computed by replacing y(r, n) in equation (3) with $p_{m_i}(r,n)$:

$$\hat{p}_{m_D}(r,m) = \sum_{n=0}^{M-1} w(n)p_{m_D}(r,n)\exp\left(-j\frac{2\pi}{M}nm\right). \quad (7)$$

In order to distinguish this PSF from the PSF of equation (6), $\hat{p}_{m_D}(r,m_D)$ is named a "Doppler-PSF." A Doppler-PSF may be pre-computed given a basic PSF (i.e. a PSF generated under the assumption of zero Doppler frequency), the number of pulses and FFT size.

For the special case where w(n)=1, n=0, 1, 2, . . . , N. substituting equation (6) into equation (7) yields:

$$\hat{p}_{m_D}(r,m) = \begin{cases} M\left[\left(\exp\left(j\frac{2\pi}{MT_p}m_D r\right)\exp(j\phi(r))\right) \otimes \exp(j\phi(r))\right] & \text{if } m = m_D \\ 0 & \text{if } m \neq m_D \end{cases}$$

Note: such an orthogonality condition does not generally hold if $w(n) \neq 1$.

Figure 5A:
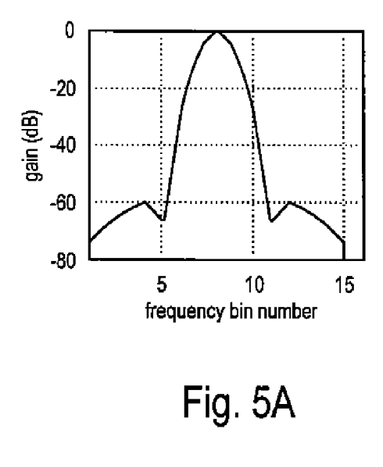
FIG. 5A shows a cross-section through a two dimensional range×Doppler PSF, showing a section parallel to the Doppler frequency axis.
Figure 5B:
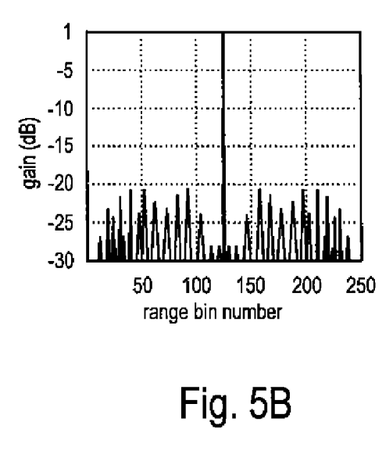
FIG. 5B shows a cross-section through a two dimensional range×Doppler frequency PSF, showing a section parallel to the range axis.

Referring now to FIGS. 5A and 5B, it can be seen that the cross-cut of a Doppler-PSF along range typically looks exactly like a one-dimensional PSF (see e.g. FIG. 2B), while the cross-cut along frequency looks like a conventional Doppler filter, i.e. has a wide beamwidth in frequency.

To detect targets, the system 20 identifies the largest signal in the pulse-compressed signal in range×Doppler space. Specifically, if the signal power level is greater than the pre-determined threshold, a two-dimensional Doppler-PSF corresponding to the range bin and Doppler of the detected target/scatterer is generated (according to equations (6) and (7)) and subtracted. The process is repeated until there are no samples in the residue greater than the threshold.

In some cases, the detection and estimation of target Doppler by the above-described techniques is dependent on the level of sidelobes of Doppler filters. Thus, it is desirable to mitigate sidelobes of Doppler filters and also increase the frequency resolution of Doppler filters. Specifically, this should be done without increasing the number of transmitted pulses to thereby conserve radar resources. One way that target detection may be significantly degraded is if the target Doppler frequencies do not exactly fall on the frequencies of the Doppler filters. However, using a FFT size significantly larger than the number of pulses (thus zero padding is required for Doppler filtering) can be used to significantly improve detection.

While the particular systems and methods for sidelobe reduction using detect-and-subtract techniques as herein shown and disclosed in detail are fully capable of obtaining the objects and providing the advantages herein before stated, it is to be understood that they are merely illustrative of the presently preferred embodiments of the invention and that no limitations are intended to the details of construction or design herein shown other than as described in the appended claims.

What is claimed is:

1. A method for detecting a first target and a second target, said method comprising the steps of:
    transmitting a coded pulse signal for scattering by the first and second targets to generate a return signal;
    receiving said return signal;
    applying pulse compression to said return signal to produce a pulse-compressed signal;
    operating on said pulse-compressed signal to identify a point spread function (PSF) corresponding to said first target, said point spread function having a peak and accompanying time-sidelobes;
    subtracting said point spread function from said pulse-compressed signal to generate a residual signal; and
    identifying a peak in said residual signal, said identified peak corresponding to said second target.

2. A method as recited in claim 1 wherein said coded pulse signal has a pseudo-random coded waveform.

3. A method as recited in claim 1 wherein said coded pulse signal has a linear frequency modulated waveform.

4. A method as recited in claim 1 wherein said operating and subtracting steps are accomplished using a constant false alarm rate (CFAR) technique.

5. A method as recited in claim 1 wherein said operating step includes the steps of:
    identifying a location peak phase and radar cross section for the first target; and
    using said location, radar cross section, and peak phase to scale and shift the point spread function corresponding to said first target prior to said subtraction step.

6. A method as recited in claim 1 wherein said point spread function corresponding to said first target is generated in two-dimensional (range×Doppler) space.

7. A method as recited in claim 1 wherein said return signal has a frequency, $f_c$, said first target has a radial speed, v, and wherein said return signal has a pseudo-random coded waveform, c(r) and a chip interval, $T_c$, with the pseudo-code being modulated by said first target as $c_R(rT_c)=c(rT_c)\exp(i2\pi f_d rT_c)$, where $$f_d = -\frac{2v}{c}f_c,$$

and r denotes the range bin index, and wherein said point spread function corresponding to said first target $p_f$ is computed as a convolution of $c_R(r)$ with c(r); $p_f(r)=c_R(r)\otimes c(r)$.

8. A method as recited in claim 1 wherein said return signal includes a plurality of pulses in a coherent pulse interval and said operating step comprises the steps of:
    weighting said return signal;
    applying pulse compression to said return signal; and
    applying a fast Fourier transform to said weighted pulse-compressed signal to create a Doppler filtered signal.

9. A method for detecting a first target and a second target, said method comprising the steps of:
    transmitting a coded pulse signal for scattering by the first and second targets to generate a return signal;
    receiving said return signal;
    applying pulse compression to said return signal to produce a pulse-compressed signal;
    identifying a point spread function corresponding to said first target;
    subtracting said point spread function from said pulse-compressed signal to generate a residual signal; and
    identifying a peak in said residual signal, said identified peak corresponding to said second target.

10. A method as recited in claim 9 wherein said coded pulse signal has a pseudo-random coded waveform.

11. A method as recited in claim 9 wherein said coded pulse signal has a linear frequency modulated waveform.

12. A method as recited in claim 9 wherein said identifying and subtracting steps are accomplished using a constant false alarm rate (CFAR) technique.

13. A method as recited in claim 9 wherein said identifying step includes the steps of:
    determining a location, radar cross section, and peak phase for the first target; and
    using said location, peak phase and radar cross section to scale and shift the point spread function corresponding to said first target prior to said subtraction step.

14. A method as recited in claim 9 wherein said point spread function corresponding to said first target is generated in two-dimensional (range×Doppler) space.

15. A method as recited in claim 9 wherein said coded pulse signal has a frequency, $f_c$, said first target has a radial speed, v, and wherein said pulse-compressed signal has a pseudo-random coded waveform, c(r) and a chip interval, $T_c$, with the pseudo-code being modulated by said first target as $c_R(rT_c)=c(rT_c)\exp(i2\pi f_d rT_c)$, where $$f_d = -\frac{2v}{c}f_c,$$

and r denotes the range bin index, and wherein said point spread function corresponding to said first target $p_f$ is computed as a convolution of $c_R(r)$ with c(r); $p_f(r)=c_R(r)\otimes c(r)$.

16. A method as recited in claim 9 wherein said return pulse signal includes a plurality of pulses in a coherent pulse interval and said identifying step comprises the steps of:
    applying pulse compression to said return signal to produce a pulse-compressed signal;
    weighting said pulse-compressed signal; and
    applying a fast Fourier transform to said weighted pulse-compressed signal to create a Doppler filtered signal.

17. A radar system for detecting a first target and a second target, said system comprising:
    a transmitter for transmitting a coded pulse signal for scattering by the first and second targets to generate a return signal;
    a receiver for receiving said return signal;
    a means for applying pulse compression to said return signal to produce a pulse-compressed signal;
    a means for operating on said pulse-compressed signal to identify a point spread function corresponding to said first target, said point spread function having a peak and a pair of time-sidelobes with said peak being indicative of said first target;

a means for subtracting said point spread function from said pulse-compressed signal to generate a residual signal; and a means for identifying a peak in said residual signal, said identified peak corresponding to said second target.

18. A radar system as recited in claim 17 wherein said coded pulse signal has a pseudo-random coded waveform.

19. A radar system as recited in claim 17 wherein said coded pulse signal has a linear frequency modulated waveform.

20. A radar system as recited in claim 17 wherein said operating means uses a constant false alarm rate (CFAR) technique.

* * * * *

UNITED STATES PATENT AND TRADEMARK OFFICE
CERTIFICATE OF CORRECTION

PATENT NO. : 7,250,900 B2
APPLICATION NO. : 11/207430
DATED : August 19, 2005
INVENTOR(S) : Katsumi Ohnishi It is certified that error appears in the above-identified patent and that said Letters Patent is hereby corrected as shown below:

Column 3, Line 26
DELETE
" $f_c$ "
INSERT
-- $f_c$ --

Column 3, Line 28
DELETE
" v "
INSERT
-- $v$ --

Column 3, Line 31
DELETE
" $c_R(rT_c)=c(rT_c)\exp(i2\pi\theta_d rT_c)$ "
INSERT
-- $c_R(rT_c)=c(rT_c)\exp(i2\pi f_d rT_c)$ --

Column 6, Line 18
DELETE
" f "
INSERT
-- $f$ --

Column 6, Line 30
DELETE
" f "
INSERT
-- $f$ --

Column 7, Line 10
DELETE
" $\exp(j2\pi \hat{f}_1 r)\exp(j\phi(r)), l=1,2,...,L.$ "
INSERT
-- $\exp(j2\pi \hat{f}_l r)\exp(j\phi(r)), l=1,2,...,L.$ --

UNITED STATES PATENT AND TRADEMARK OFFICE
CERTIFICATE OF CORRECTION

PATENT NO. : 7,250,900 B2
APPLICATION NO. : 11/207430
DATED : August 19, 2005
INVENTOR(S) : Katsumi Ohnishi It is certified that error appears in the above-identified patent and that said Letters Patent is hereby corrected as shown below:

Column 7, Line 61
DELETE
" $p_{f_D}(r,n) = \exp(j2\pi n T_P f_D) \exp(j2\pi f_D r) \exp(j\phi(r)) \otimes \exp(j\phi(r))$ "
INSERT
-- $p_{f_D}(r,n) = \exp(j2\pi n T_P f_D) \exp(j2\pi f_D r) \exp(j\phi(r)) \otimes \exp(j\phi(r))$ --

Column 8, Line 1
DELETE
"$f_D = m_D / (MTP)$ "
INSERT
-- $f_D = m_D / (MT_P)$ --

Column 8, Line 14
DELETE
" $p_{m_i}(r,n)$ "
INSERT
-- $p_{m_D}(r,n)$ --

Column 9, Line 47
DELETE
" $f_c$ "
INSERT
-- $f_c$ --

Column 9, Line 51
DELETE
" $(i2\pi f_d r T_c)$ "
INSERT
-- $(i2\pi f_d r T_c)$ --

UNITED STATES PATENT AND TRADEMARK OFFICE
CERTIFICATE OF CORRECTION

PATENT NO. : 7,250,900 B2
APPLICATION NO. : 11/207430
DATED : August 19, 2005
INVENTOR(S) : Katsumi Ohnishi It is certified that error appears in the above-identified patent and that said Letters Patent is hereby corrected as shown below:

Column 10, Line 37
DELETE
" $c_R(rT_c) = c(rT_c)\exp(i2\pi f_d rT_c)$ "
INSERT
-- $c_R(rT_c) = c(rT_c)\exp(i2\pi f_d rT_c)$ --

Signed and Sealed this

Thirteenth Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 7,250,900 B2
APPLICATION NO. : 11/207430
DATED : July 31, 2007
INVENTOR(S) : Katsumi Ohnishi It is certified that error appears in the above-identified patent and that said Letters Patent is hereby corrected as shown below:

Column 3, Line 26
DELETE
" $f_c$ "
INSERT
-- $f_c$ --

Column 3, Line 28
DELETE
" v "
INSERT
-- $v$ --

Column 3, Line 31
DELETE
" $c_R(rT_c)=c(rT_c)\exp(i2\pi\theta_d rT_c)$ "
INSERT
-- $c_R(rT_c)=c(rT_c)\exp(i2\pi f_d rT_c)$ --

Column 6, Line 18
DELETE
" f "
INSERT
-- $f$ --

Column 6, Line 30
DELETE
" f "
INSERT
-- $f$ --

Column 7, Line 10
DELETE
" $\exp(j2\pi \hat{f}_1 r)\exp(j\phi(r)), l=1,2,...,L.$ "
INSERT
-- $\exp(j2\pi \hat{f}_l r)\exp(j\phi(r)), l=1,2,...,L.$ --

UNITED STATES PATENT AND TRADEMARK OFFICE
CERTIFICATE OF CORRECTION

PATENT NO. : 7,250,900 B2
APPLICATION NO. : 11/207430
DATED : July 31, 2007
INVENTOR(S) : Katsumi Ohnishi It is certified that error appears in the above-identified patent and that said Letters Patent is hereby corrected as shown below:

Column 7, Line 61
DELETE
" $p_{f_D}(r,n) = \exp(j2\pi n T_P f_D)\exp(j2\pi \mathrm{f}_D r)\exp(j\phi(r)) \otimes \exp(j\phi(r))$ "
INSERT
-- $p_{f_D}(r,n) = \exp(j2\pi n T_P f_D)\exp(j2\pi f_D r)\exp(j\phi(r)) \otimes \exp(j\phi(r))$ --

Column 8, Line 1
DELETE
"$f_D = m_D / (MTP)$"
INSERT
-- $f_D = m_D / (MT_P)$ --

Column 8, Line 14
DELETE
" $p_{m_i}(r,n)$ "
INSERT
-- $p_{m_D}(r,n)$ --

Column 9, Line 47
DELETE
" $\mathrm{f}_c$ "
INSERT
-- $f_c$ --

Column 9, Line 51
DELETE
" $(i2\pi \mathrm{f}_d r T_c)$ "
INSERT
-- $(i2\pi f_d r T_c)$ --

UNITED STATES PATENT AND TRADEMARK OFFICE
CERTIFICATE OF CORRECTION

PATENT NO. : 7,250,900 B2
APPLICATION NO. : 11/207430
DATED : July 31, 2007
INVENTOR(S) : Katsumi Ohnishi It is certified that error appears in the above-identified patent and that said Letters Patent is hereby corrected as shown below:

Column 10, Line 37
DELETE
" $c_R(rT_c) = c(rT_c)\exp(i2\pi f_d rT_c)$ "
INSERT
-- $c_R(rT_c) = c(rT_c)\exp(i2\pi f_d rT_c)$ --

This certificate supersedes Certificate of Correction issued November 13, 2007.

Signed and Sealed this

Eleventh Day of December, 2007

JON W. DUDAS
*Director of the United States Patent and Trademark Office*